(12) United States Patent
Das

(10) Patent No.: US 10,951,138 B2
(45) Date of Patent: *Mar. 16, 2021

(54) METHOD AND APPARATUS FOR COMMUTATION OF DRIVE COILS IN A LINEAR DRIVE SYSTEM WITH INDEPENDENT MOVERS

(71) Applicant: Rockwell Automation Technologies, Inc., Mayfield Heights, OH (US)

(72) Inventor: Jadav Das, Lake Grove, NY (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/449,835

(22) Filed: Jun. 24, 2019

(65) Prior Publication Data

US 2019/0312533 A1    Oct. 10, 2019

Related U.S. Application Data

(63) Continuation of application No. 15/719,153, filed on Sep. 28, 2017, now Pat. No. 10,381,958.

(51) Int. Cl.
*H02P 6/00* (2016.01)
*H02P 25/064* (2016.01)
*H02P 25/06* (2016.01)

(52) U.S. Cl.
CPC .............. *H02P 6/006* (2013.01); *H02P 25/06* (2013.01); *H02P 25/064* (2016.02); *H02P 2207/05* (2013.01)

(58) Field of Classification Search
CPC ......... H02P 25/06; H02P 25/064; H02P 6/006
See application file for complete search history.

(56) References Cited

U.S. PATENT DOCUMENTS 5,843,252 A    12/1998  Murphy
6,325,877 B1   12/2001  Murphy
(Continued)

FOREIGN PATENT DOCUMENTS

EP    2131484 A1    12/2009
EP    2806547 A1    11/2014
JP    3426362 B2     7/2003

OTHER PUBLICATIONS

Lizhan Zeng et al., A Vector Control Method of LPMBDCM Considering Effects of PM Flux Linkage Harmonic and Cogging Force, IEEE Transactions on Magnetics, vol. 46, No. 3, Mar. 2010—(6) pages.
Nicholas Moehle et al., Optimal Current Waveforms for Brushless Permanent Magnet Motors, Stanford University, Apr. 14, 2014—(24) pages.
(Continued)

*Primary Examiner* — Rina I Duda
(74) *Attorney, Agent, or Firm* — Boyle Fredrickson, SC

(57) ABSTRACT

A motor controller is provided that executes a commutation routine in one of a plurality of operating modes to regulate current provided to drive coils in a linear motion system. The motor controller generated currents for each of the drive coils in a first operating mode to minimize the copper losses in the drive coils, in a second operating mode to maximize the force applied to the mover, in a third operating mode to provide balanced currents between the drive coils, and in a fourth operating mode to provide currents according to a selected operating point that combines characteristics of the first three operating points. The motor controller may also monitor each of the drive coils for saturation and redistribute at least a portion of the current required to control operation of the mover to the other drive coils when one of the drive coils is saturated.

20 Claims, 10 Drawing Sheets

(56) References Cited

U.S. PATENT DOCUMENTS

| | | | | |
|---|---|---|---|---|
| 6,876,107 | B2* | 4/2005 | Jacobs | B60L 15/38 |
| | | | | 310/12.19 |
| 6,952,086 | B1* | 10/2005 | Krefta | H02K 17/30 |
| | | | | 318/135 |
| 7,888,827 | B2 | 2/2011 | Kaneshige et al. | |
| 7,932,684 | B2* | 4/2011 | O'Day | G01D 5/2455 |
| | | | | 318/135 |
| 8,384,251 | B2* | 2/2013 | Shikayama | H02K 11/215 |
| | | | | 310/12.15 |
| 8,796,959 | B2* | 8/2014 | Sato | H02P 25/064 |
| | | | | 318/135 |
| 8,970,142 | B2* | 3/2015 | Inoue | H02P 25/06 |
| | | | | 318/135 |
| 10,381,958 | B2* | 8/2019 | Das | H02K 41/02 |
| 2013/0119897 | A1 | 5/2013 | Wernersbach et al. | |
| 2013/0257336 | A1 | 10/2013 | Gadda | |
| 2014/0265645 | A1 | 9/2014 | Jacobs et al. | |
| 2016/0190966 | A1 | 6/2016 | Kadynski et al. | |

OTHER PUBLICATIONS

Christof Rohrig, Optimal Communication Law for Three-Phrase Surface-Mounted Permanent Magnet Linear Synchronous Motors, IEEE Conference on Decision & Control, Dec. 13-15, 2006—(6) pages.

Damien Flieller et al., A Self-Learning Solution for Torque Ripple Reduction for Non-Sinusoidal Permanent Magnet Motor Drives Based on Artificial Neural Networks, Author manuscript, published in Transaction on Industrial Electronic, Feb. 25, 2013—(12) pages.

Atallah et al., Torque-Ripple Minimization in Modular Permanent-Magnet Brushless Machines, IEEE Transactions on Industry Applications, vol. 39, No. 6, Nov./Dec. 2003—(8) pages.

A.P. Wu et al., Cancellation of Torque Ripple Due to Nonidealities of Permanent Magnet Synchrous Machine Drives, 0-7803-7754-0/03, 2003, IEEE (pp. 256-261)—(6) pages.

Farhad Aghili et al., A Modular and High-Precision Motion Control System With an Integrated Motor, IEEE/ASME Transactions on Mechatronics, vol. 12, No. 3, Jun. 2007—(13) pages.

\* cited by examiner

METHOD AND APPARATUS FOR COMMUTATION OF DRIVE COILS IN A LINEAR DRIVE SYSTEM WITH INDEPENDENT MOVERS

This application is a continuation of and claims priority to U.S. application Ser. No. 15/719,153, filed Sep. 28, 2017, the entire contents of which is incorporated herein by reference.

BACKGROUND INFORMATION

The subject matter disclosed herein relates to motion control systems and, more specifically, to a method and apparatus for determining coil current references for drive coils used to control operation of multiple independent movers traveling along a track in a linear drive system.

Motion control systems utilizing movers and linear motors can be used in a wide variety of processes (e.g. packaging, manufacturing, and machining) and can provide an advantage over conventional conveyor belt systems with enhanced flexibility, extremely high speed movement, and mechanical simplicity. The motion control system includes a set of independently controlled "movers" each supported on a track for motion along the track. The track is made up of a number of track segments that, in turn, hold individually controllable electric coils. Successive activation of the coils establishes a moving electromagnetic field that interacts with the movers and causes the mover to travel along the track. Sensors may be spaced at fixed positions along the track and/or on the movers to provide information about the position and speed of the movers.

Each of the movers may be independently moved and positioned along the track in response to the moving electromagnetic field generated by the coils. In a typical system, the track forms a closed path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the closed path by returning to the loading station to receive another unit of the product.

Typically, each mover includes one or more permanent magnets mounted to the mover which, in combination with the drive coils spaced along the track, form a linear drive system. A motor controller generates a voltage having a variable amplitude and variable frequency which, in turn, results in a desired current flowing through each drive coil. The current flowing through the drive coil generates an electromagnetic field which interacts with the magnetic field produced by the permanent magnets to cause the movers to travel along the track.

As each mover travels past a coil, the permanent magnets create a back-emf voltage in each coil that is counter to the applied voltage. The back-emf voltage interacts with the applied voltage and current in each coil. If the back-emf voltage and the current in the coil are both sinusoidal waveforms, the interaction between the back-emf and the current in the coil is smooth, meaning there are no force pulsations. If, however, one or both of the waveforms are non-sinusoidal, then an undesirable force pulsation may be present on the mover. In addition, the permanent magnets mounted on the mover attempt to align themselves with the maximum amount of ferromagnetic material present on the track, creating a cogging force. The force pulsations due to non-sinusoidal waveforms combines with the cogging force to generate an undesirable force on the mover as it travels in the linear drive system.

Several factors impact the shape of the waveforms in the linear drive system. Some of the factors include the design, shape, and placement of the magnets on the mover as well as the design, pitch, and placement of the coils along the track. These factors make it difficult to design an ideal linear drive system with purely sinusoidal waveforms and no cogging force. Still additional factors include the size of the mover and the number of coils with which the mover will interact at one time. These factors impact not only the force pulsations on the mover but also whether the currents are balanced between coils and the amount of copper losses in the coils.

A designer for the linear drive system must balance the competing effects of the different factors when designing the linear drive system. The designer must further balance manufacturing and material costs associated with the various design factors. As a result, a linear drive system typically has current and back-emf waveforms that are not purely sinusoidal as well as some amount of cogging force between the magnets in the movers and the laminations of the track. In addition, there may be variations in the linear drive system due, for example, to variations in placement of coils on the track along a straight segment and along a curved segment. Therefore, movers of different sizes and of different construction will interact differently with the coils along a track and may further interact differently along different sections of a single track.

Thus, it would be desirable to provide an improved method and system for providing current to the coils in a linear drive system. It is also desirable to provide different methods of regulating the current to the coils at different segments of the track according to the application requirements.

BRIEF DESCRIPTION

The subject matter disclosed herein describes an improved method and system for providing current to the drive coils in a linear drive system, where the linear drive system includes multiple, independent movers traveling along a track. A motor controller is provided that utilizes different criterion for regulating the current to the coils at different segments of the track according to the application requirements. A motor controller is configured to execute a commutation routine in one of a plurality of operating modes, where each operating mode utilizes one of the different criterion for regulating the current. The motor controller identifies a set of drive coils that will be energized to control operation of a mover as a function of the position of the mover on the track. The motor controller then generates the current for each of the drive coils in the set to control operation of the mover. In a first operating mode, the motor controller generates currents for each of the drive coils in order to minimize the copper losses in the drive coils. In a second operating mode, the motor controller generates currents for each of the drive coils to maximize the force applied to the mover. In a third operating mode, the motor controller generates current for each of the drive coils that are balanced between the drive coils. In a fourth operating mode, the motor controller generates current for each of the drive coils according to a selected operating point that combines characteristics of the first three operating modes. It is another aspect of the invention, that the motor controller monitors each of the drive coils for saturation and redistributes at least a portion of the current required to control operation of the mover to the other drive coils when one of the drive coils is saturated.

According to one embodiment of the invention, a method for controlling commutation of drive coils to control operation of a mover along a track in a linear drive system is disclosed. A position of the mover along the track is obtained with a motor controller, and a plurality of drive coils proximate the position of the mover are identified with the motor controller. An electromagnetic field generated by a current flowing in each of the plurality of drive coils is operative to engage at least one drive magnet on the mover. A reference signal is received at the motor controller corresponding to a desired operation of the mover, and the motor controller selects one of a plurality of commutation modes to determine a current reference for each of the plurality of drive coils. The current reference for each of the plurality of drive coils is determined with the motor controller according to the selected commutation mode.

According to another embodiment of the invention, a motor controller for controlling commutation of drive coils to control operation of a mover along a track in a linear drive system is disclosed. The motor controller includes at least one first input, at least one second input, a power segment, and a processor. The first input is operative to receive a position feedback signal corresponding to a position of the mover along the track, and the second input is operative to receive a reference signal corresponding to a desired operation of the mover along the track. The power segment is operative to provide a current to each of a plurality of drive coils operatively connected to the power segment. The processor is operative to identify a portion of the drive coils proximate the position of the mover along the track, where an electromagnetic field generated by the current flowing in each coil is operative to engage at least one drive magnet on the mover. The processor is also operative to generate a current reference signal for each coil in the portion of the drive coils proximate the position of the mover along the track according to one of a plurality of commutation modes and to transmit the current reference signal for each drive coil in the portion of the drive coils proximate the position of the mover to the power segment. The power segment provides the current to each coil according to the corresponding current reference signal.

According to still another embodiment of the invention, a method for controlling commutation of drive coils to control operation of a mover along a track in a linear drive system is disclosed. A position of the mover along the track is identified with a motor controller, and the motor controller identifies multiple drive coils proximate the position of the mover, where an electromagnetic field generated by a current flowing in each of the drive coils is operative to engage at least one drive magnet on the mover. A reference signal is received at the motor controller corresponding to a desired operation of the mover, and the motor controller determines a desired force to be applied to the mover as a function of the reference signal and of the position of the mover. One of a plurality of commutation modes is selected in the motor controller to determine a current reference for each of the drive coils. The motor controller determines the current reference for each of the plurality of drive coils as a function of: the selected commutation mode, the position of the mover, the desired force to be applied to the mover as a function of the reference signal, and a back-emf value for each of the drive coils.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
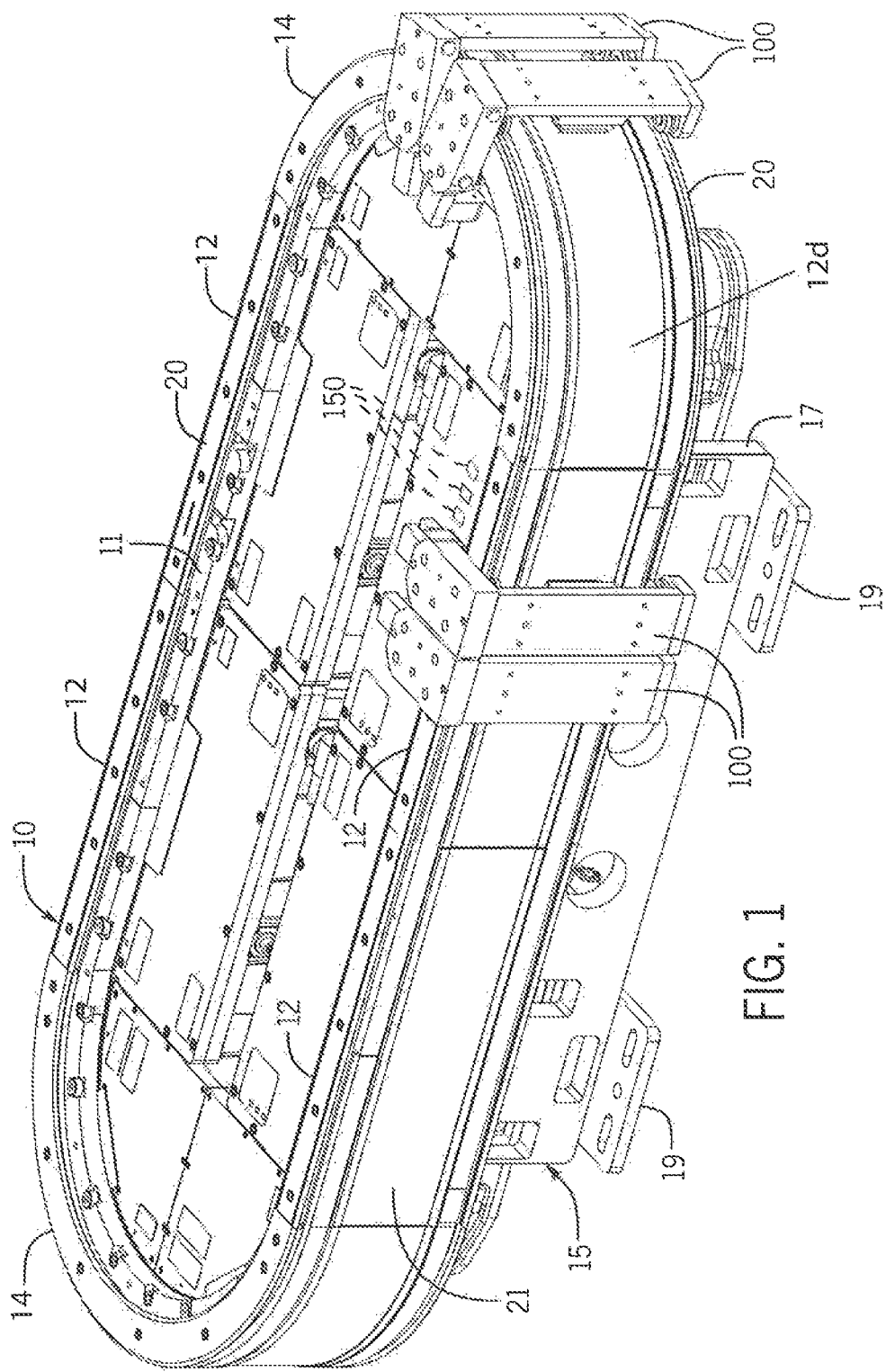
FIG. 1 is an isometric view of an exemplary transport system incorporating multiple movers travelling along a closed curvilinear track according to one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIG. 1, an exemplary transport system for moving articles or products includes a track 10 made up of multiple segments 12, 14. According to the illustrated embodiment, the segments define a generally closed loop supporting a set of movers 100 movable along the track 10. The track 10 is oriented in a horizontal plane and supported above the ground by a base 15 extending vertically downward from the track 10. According to the illustrated embodiment, the base 15 includes a pair of generally planar support plates 17, located on opposite sides of the track 10, with mounting feet 19 on each support plate 17 to secure the track 10 to a surface. The illustrated track 10 includes four straight segments 12, with two straight segments 12 located along each side of the track and spaced apart from the other pair. The track 10 also includes four curved segments 14 where a pair of curved segments 14 is located at each end of the track 10 to connect the pairs of straight segments 12. The four straight segments 12 and the four curved segments 14 form a generally oval track and define a closed surface over which each of the movers 100 may travel. It is understood that track segments of various sizes, lengths, and shapes may be connected together to form a track 10 without deviating from the scope of the invention.

For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. Further, each track segment 12, 14 is shown in a generally horizontal orientation. The track segments 12, 14 may also be oriented in a generally vertical orientation and the width of the track 10 may be greater in either the horizontal or vertical direction according to application requirements. The movers 100 will travel along the track and take various orientations according to the configuration of the track 10 and the relationships discussed herein may vary accordingly.

Each track segment 12, 14 includes a number of independently attached rails 20 on which each mover 100 runs. According to the illustrated embodiment, rails 20 extend generally along the outer periphery of the track 10. A first rail 20 extends along an upper surface 11 of each segment and a second rail 20 extends along a lower surface 13 of each segment. It is contemplated that each rail 20 may be a singular, molded or extruded member or formed from multiple members. It is also contemplated that the cross section of the rails 20 may be circular, square, rectangular, or any other desired cross-sectional shape without deviating from the scope of the invention. The rails 20 generally conform to the curvature of the track 10 thus extending in a straight path along the straight track segments 12 and in a curved path along the curved track segments 14. The rails 20 may be thin with respect to the width of the track 10 and span only a partial width of the surface of the track 10 on which it is attached. According to the illustrated embodiment, each rail 20 includes a base portion 22 mounted to the track segment and a track portion 24 along which the mover 100 runs. Each mover 100 includes complementary rollers 110 to engage the track portion 24 of the rail 20 for movement along the track 10.

Figure 3:
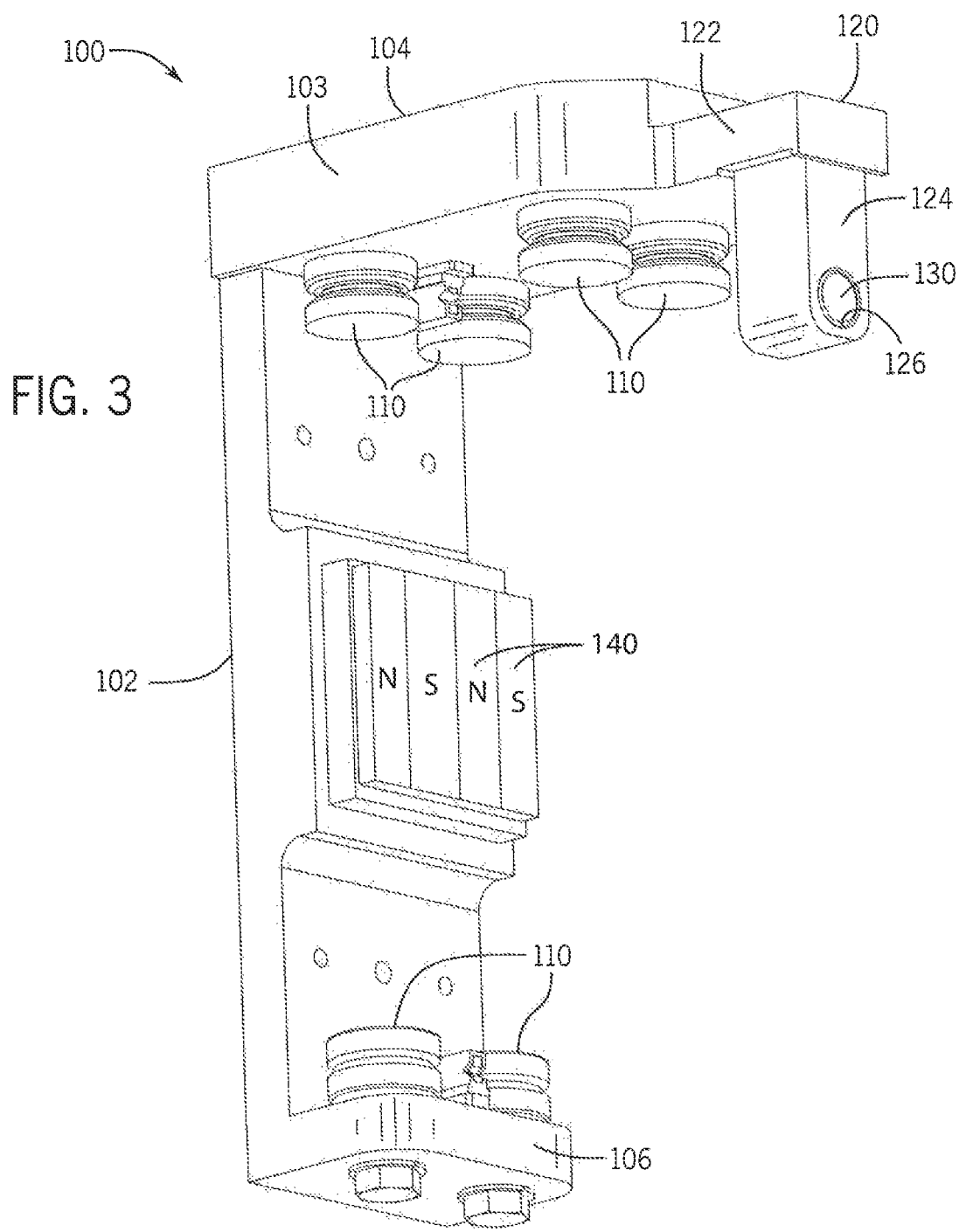
FIG. 3 is an isometric view of a mover from the transport system of FIG. 1.

One or more movers 100 are mounted to and movable along the rails 20 on the track 10. With reference next to FIG. 3, an exemplary mover 100 is illustrated. Each mover 100 includes a side member 102, a top member 104, and a bottom member 106. The side member 102 extends for a height at least spanning a distance between the rail 20 on the top surface 11 of the track 10 and the rail 20 on the bottom surface 13 of the track 10 and is oriented generally parallel to a side surface 21 when mounted to the track 10. The top member 104 extends generally orthogonal to the side member 102 at a top end of the side member 102 and extends across the rail 20 on the top surface 11 of the track 10. The top member 104 includes a first segment 103, extending orthogonally from the side member 102 for the width of the rail 20, which is generally the same width as the side member 102. A set of rollers 110 are mounted on the lower side of the first segment 103 and are configured to engage the track portion 24 of the rail 20 mounted to the upper surface 11 of the track segment. According to the illustrated embodiment two pairs of rollers 110 are mounted to the lower side of the first segment 103 with a first pair located along a first edge of the track portion 24 of the rail and a second pair located along a second edge of the track portion 24 of the rail 20. The first and second edges and, therefore, the first and second pairs of rollers 110 are on opposite sides of the rail 20 and positively retain the mover 100 to the rail 20. The bottom member 106 extends generally orthogonal to the side member 102 at a bottom end of the side member 102 and extends for a distance sufficient to receive a third pair of rollers 110 along the bottom of the mover 100. The third pair of rollers 110 engage an outer edge of the track portion 24 of the rail 20 mounted to the lower surface 13 of the track segment. Thus, the mover 100 rides along the rails 20 on the rollers 110 mounted to both the top member 104 and the bottom member 106 of each mover 100. The top member 104 also includes a second segment 120 which protrudes from the first segment 103 an additional distance beyond the rail 20 and is configured to hold a position magnet 130. According to the illustrated embodiment, the second segment 120 of the top member 104 includes a first portion 122 extending generally parallel to the rail 20 and tapering to a smaller width than the first segment 103 of the top member 104. The second segment 120 also includes a second portion 124 extending downward from and generally orthogonal to the first portion 122. The second portion 124 extends downward a distance less than the distance to the upper surface 11 of the track segment but of sufficient distance to have the position magnet 130 mounted thereto. According to the illustrated embodiment, a position magnet 130 is mounted within a recess 126 on the second portion 124 and is configured to align with a sensor 150 mounted within the top surface 11 of the track segment.

Figure 2:
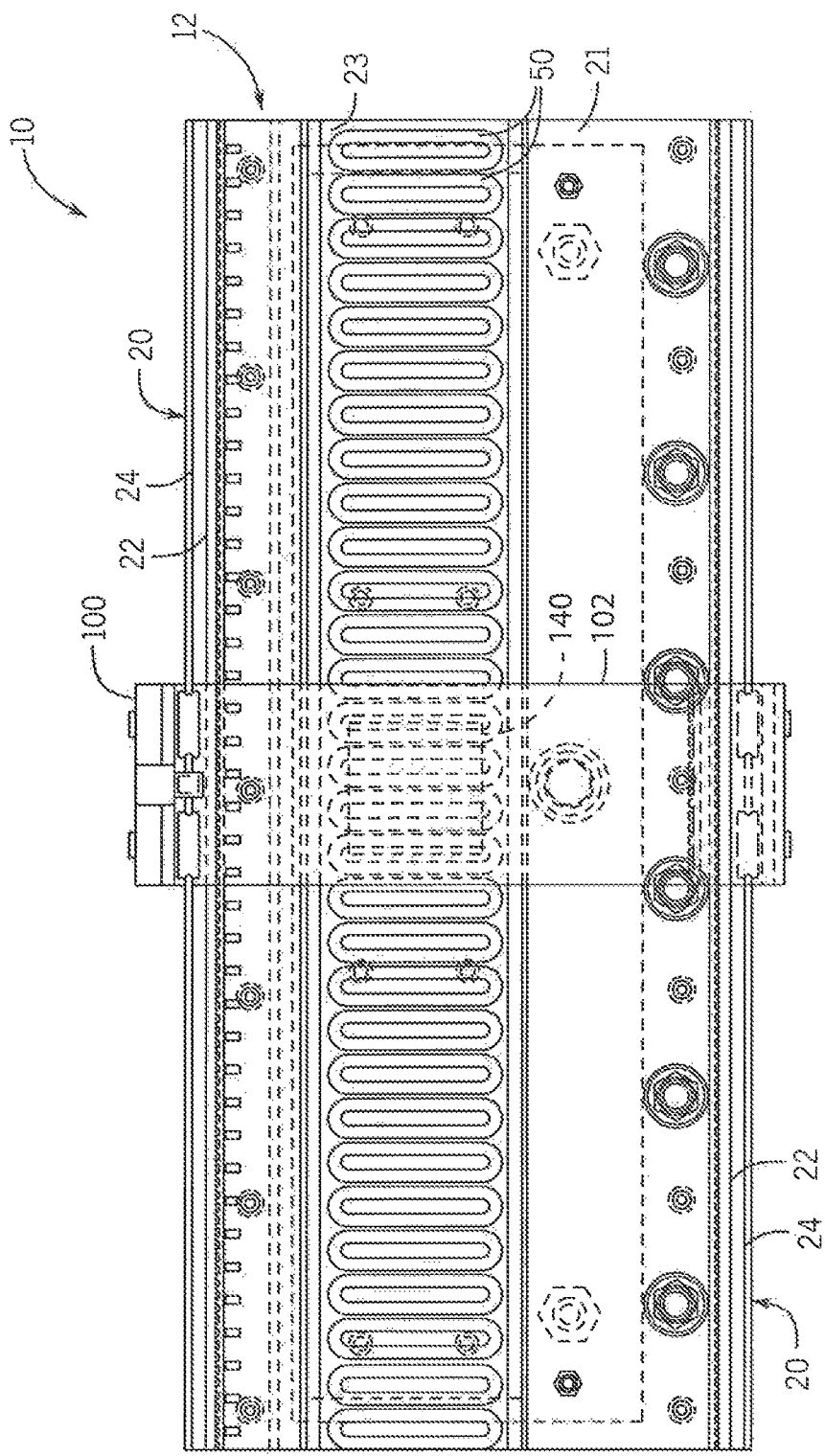
FIG. 2 is a partial side elevation view of one segment of one embodiment of the transport system of FIG. 1 illustrating activation coils distributed along one surface of the track segment.
Figure 4:
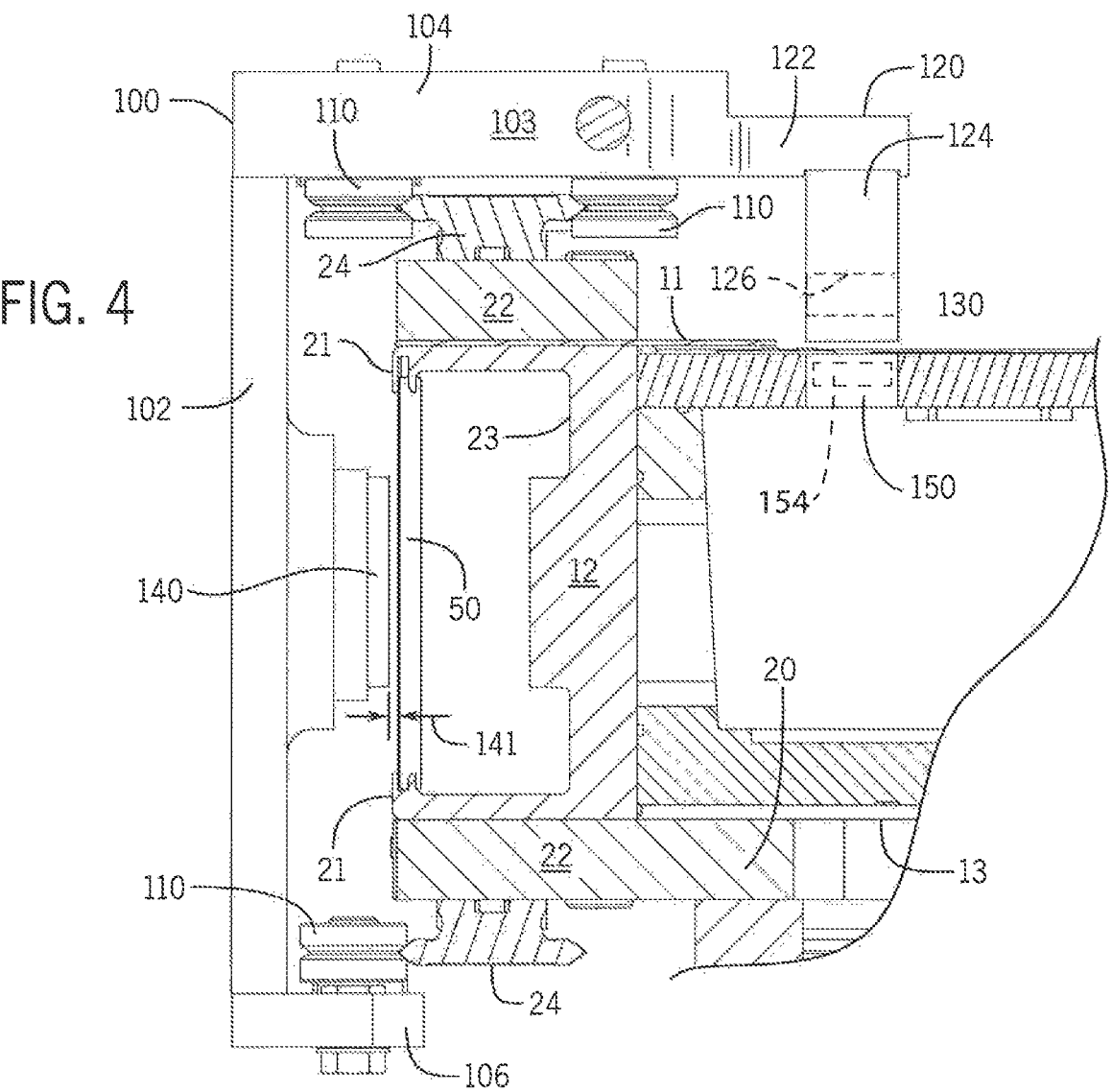
FIG. 4 is a partial sectional view of the transport system of FIG. 1.

A linear drive system is incorporated in part on each mover 100 and in part within each track segment 12, 14 to control motion of each mover 100 along the segment. According to one embodiment of the invention shown in FIG. 2, the linear drive system includes drive magnets 140 mounted to the side member 102. According to the illustrated embodiment, the drive magnets 140 are arranged in a block along an inner surface of the side member 102 with separate magnet segments alternately having a north pole, N, and south pole, S, pole facing the track segment 12. The drive magnets 140 are typically permanent magnets, and two adjacent magnet segments including a north pole and a south pole may be considered a pole-pair. The drive magnets 140 are mounted on the inner surface of the side member 102 and when mounted to the track 10 are spaced apart from a series of coils 50 extending along the track 10. As shown in FIG. 4, an air gap 141 is provided between each set of drive magnets 140 and the coils 50 along the track 10. On the track 10, the linear drive system includes a series of parallel coils 50 spaced along each track segment 12 as shown in FIG. 2. According to the illustrated embodiment, each coil 50 is placed in a channel 23 extending longitudinally along one surface of the track segment 12. The electromagnetic field generated by each coil 50 spans the air gap 141 and interacts with the drive magnets 140 mounted to the mover 100 to control operation of the mover 100.

Figure 5:
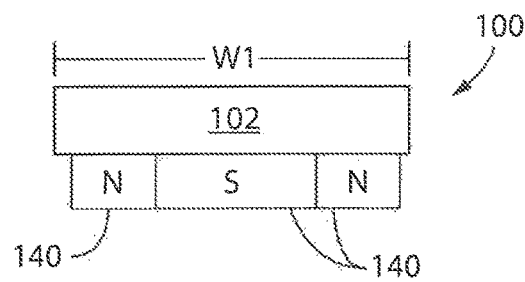
FIG. 5 is a partial sectional view of a mover illustrating an exemplary magnet configuration for a mover having a first width.
Figure 6:
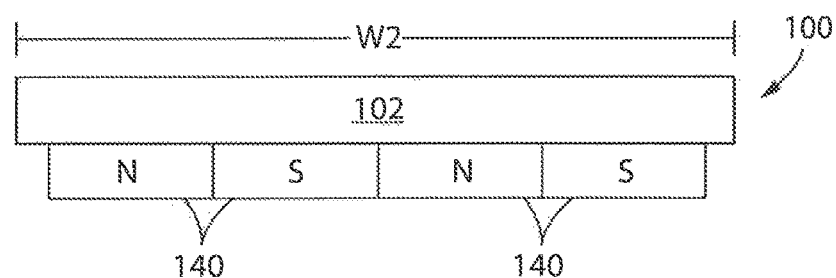
FIG. 6 is a partial sectional view of a mover illustrating an exemplary magnet configuration for a mover having a second width.
Figure 7:
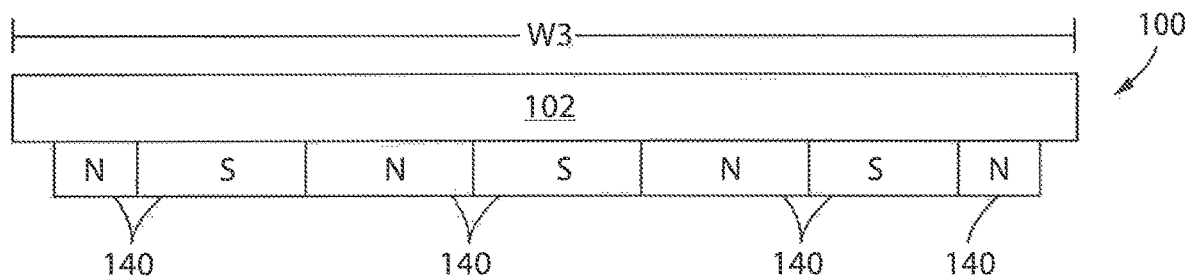
FIG. 7 is a partial sectional view of a mover illustrating an exemplary magnet configuration for a mover having a third width.

It is contemplated that a track 10 may be configured to have movers 100 of different sizes and/or movers 100 having different magnet configurations traveling along the same track. With reference next to FIGS. 5-7, three movers 100, each having a different width and a different magnet configuration are illustrated. Turning first to FIG. 5, a mover 100 having a first width, W1, is illustrated. The mover 100 includes a first half of a drive magnet 140 mounted proximate one side of the mover 100 and a second half of a drive magnet mounted proximate the other side of the mover 100. Between the two halves, a whole drive magnet 140 is mounted. Each of the two halves are arranged such that one polarity of the drive magnet 140 faces the drive coils and the whole drive magnet 140 is arranged such that the other polarity of the drive magnet 140 faces the drive coils. As illustrated, each of the half drive magnets 140 has a north pole, N, facing the drive coils and the whole drive magnet 140 has a south pole, S, facing the drive coils. Turning then to FIG. 6, a mover 100 having a second width, W2, is illustrated. The mover 100 includes four whole drive magnets positioned adjacent to each other. In a manner similar to that illustrated in FIG. 3, adjacent drive magnets 140 alternately having a north pole, N, and south pole, S, pole facing the drive coils. Turning next to FIG. 7, a mover 100 having a third width, W3, is illustrated. The mover 100 includes a first half of a drive magnet 140 mounted proximate one side of the mover 100 and a second half of a drive magnet mounted proximate the other side of the mover 100. Between the two halves, a series of whole drive magnets 140 are mounted. Each of the two halves are arranged such that one polarity of the drive magnet 140 faces the drive coils and the whole drive magnets 140 are arranged such that the polarity of the drive magnets 140 alternate between the two half magnets. As illustrated, each of the half drive magnets 140 has a north pole, N, facing the drive coils and the whole drive magnets 140 have alternating south and north poles facing the drive coils. The illustrated magnet configurations are exemplary only and not intended to be limiting. It is contemplated that magnets having, for example, different widths or different arrangements of north and south poles may be utilized without deviating from the scope of the invention.

Figure 8:
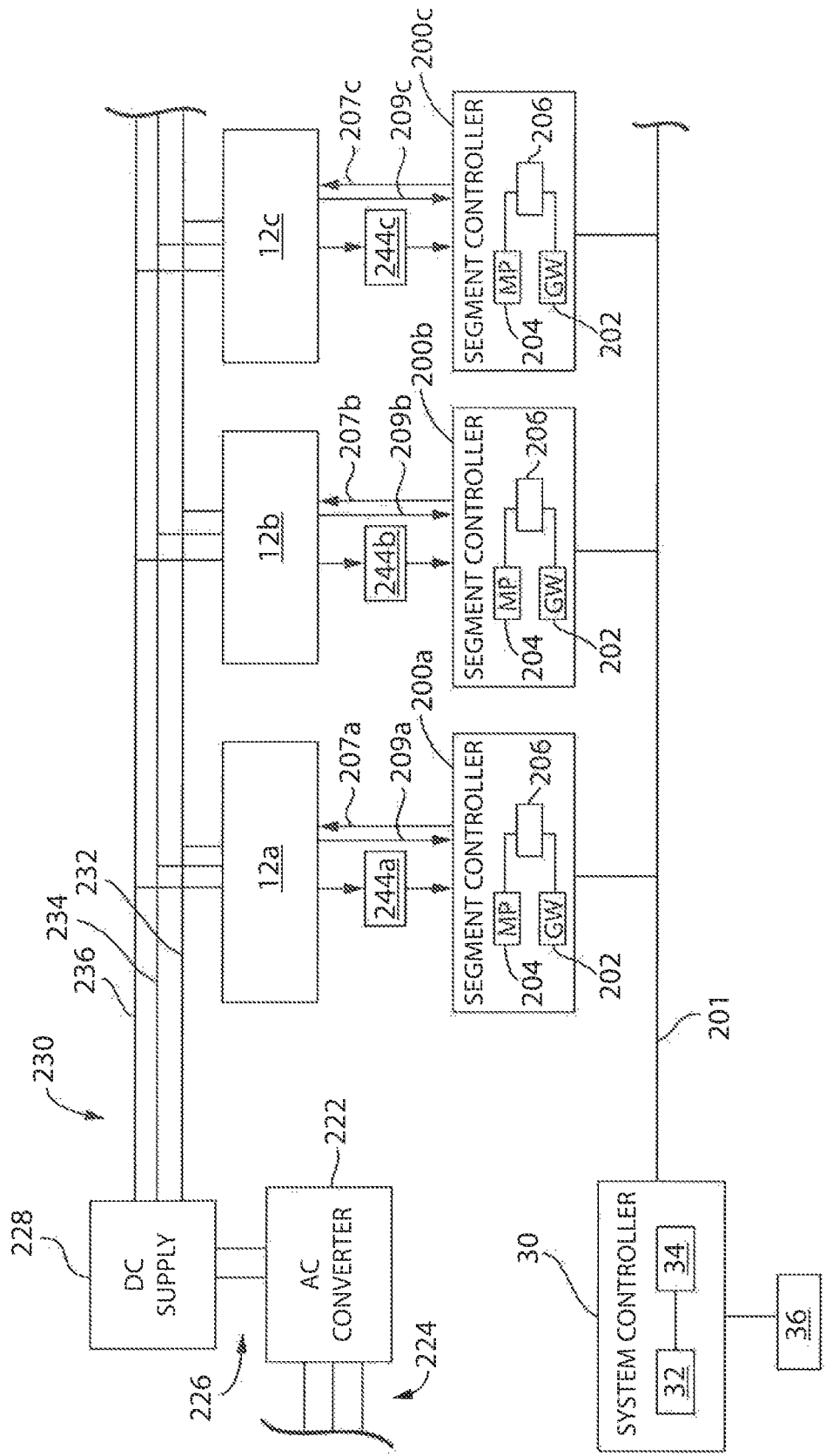
FIG. 8 is a block diagram representation of an exemplary power and control system for the transport system FIG. 1.

Turning next to FIG. 8, an exemplary power and control system for the track 10 and linear drive system is illustrated. A segment controller 200 is mounted within each track segment 12. The segment controller 200 receives command signals from a system controller 30 and generates switching signals for power segments 210 (FIG. 9) which, in turn, control activation of each coil 50. Activation of the coils 50 are controlled to drive and position each of the movers 100 along the track segment 12 according to the command signals received from the system controller 30.

The illustrated motion control system includes a system controller 30 having a processor 32 and a memory device 34. It is contemplated that the processor 32 and memory device 34 may each be a single electronic device or formed from multiple devices. The processor 32 may be a microprocessor. Optionally, the processor 32 and/or the memory device 34 may be integrated on a field programmable array (FPGA) or an application specific integrated circuit (ASIC). The memory device 34 may include volatile memory, non-volatile memory, or a combination thereof. The system controller 30 could be a Programmable Logic Controller (PLC). A user interface 36 is provided for an operator to configure the system controller 30 and to load or configure desired motion profiles for the movers 100 on the system controller 30. It is contemplated that the system controller 30 and user interface 36 may be a single device, such as a laptop, notebook, tablet or other mobile computing device. Optionally, the user interface 36 may include one or more separate devices such as a keyboard, mouse, display, touchscreen, interface port, removable storage medium or medium reader and the like for receiving information from and displaying information to a user. Optionally, the system controller 30 and user interface 36 may be integrated into an industrial computer mounted within a control cabinet and configured to withstand harsh operating environments. It is contemplated that still other combinations of computing devices and peripherals as would be understood in the art may be utilized or incorporated into the system controller 30 and user interface 36 without deviating from the scope of the invention.

One or more programs may be stored in the memory device 34 for execution by the processor 32. The system controller 30 receives one or more motion profiles for the movers 100 to follow along the track 10. A program executing on the processor 32 is in communication with a segment controller 200 on each track segment 12 via a control network 201, such as an EtherNet/IP network. The system controller 30 may transfer a desired motion profile to each segment controller 200 or, optionally, the system controller 30 may perform some initial processing based on the motion profile to transmit a segment of the motion profile to each segment controller 200 according to the portion of the motion profile to be executed along that segment. Optionally, the system controller 30 may perform still further processing on the motion profile and generate a desired switching sequence for each segment 12 that may be transmitted to the segment controller 200.

A gateway 202 in each segment controller 200 receives the communications from the system controller 30 and passes the communication to a processor 204 executing in the segment controller 200. The processor may be a microprocessor. Optionally, the processor 204 and/or a memory device within the segment controller 200 may be integrated on a field programmable array (FPGA) or an application specific integrated circuit (ASIC). It is contemplated that the processor 204 and memory device 206 may each be a single electronic device or formed from multiple devices. The memory device 206 may include volatile memory, non-volatile memory, or a combination thereof. The segment controller 200 receives the motion profile, or portion thereof, or the switching sequence transmitted from the system controller 30 and utilizes the motion profile or switching sequence to control movers 100 present along the track segment 12 controlled by that system controller 30.

Figure 9:
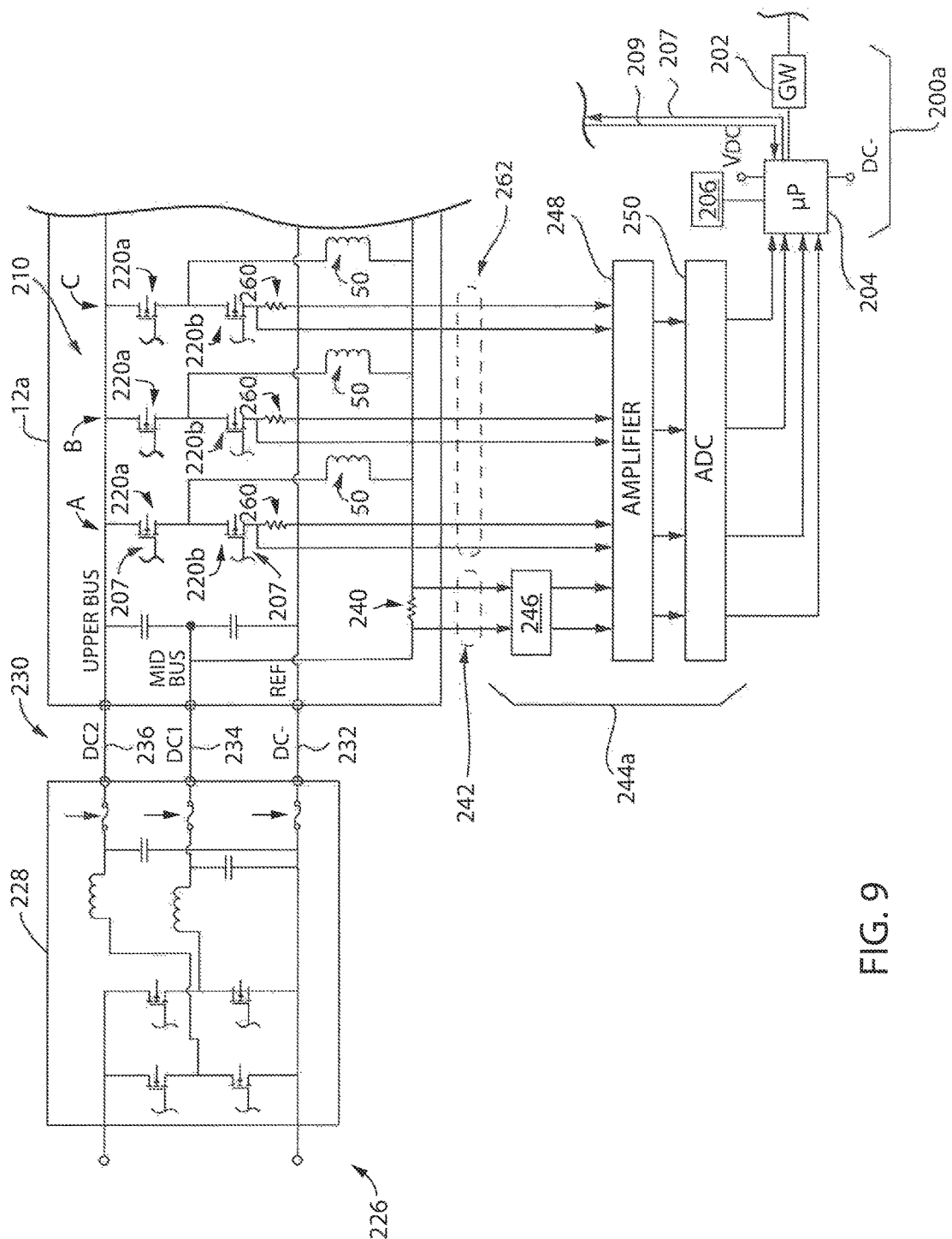
FIG. 9 is an exemplary schematic for a portion of the power and control system of FIG. 8.

With additional reference to FIG. 9, each segment controller 200 generates switching signals 207 to control operation of switching devices within one or more power segments 210 mounted within the track segment 12. The switching devices within each power segment 210 are connected between a power source and the coils 50. The switching signals are generated to sequentially energize coils 50 along a track segment, where the energized coils 50 create an electromagnetic field that interacts with the drive magnets 140 on each mover 100 to control motion of the movers 100 along the corresponding track segment 12. The switching signals 207 control operation of switching devices 220 in communication with the drive coils 50, including upper switch devices 220a and lower switching devices 220b. The switching devices 220 may be solid-state devices that are activated by the switching signals 207, including, but not limited to, transistors, such as insulated-gate bipolar transistors, thyristors, or silicon-controlled rectifiers.

According to the illustrated embodiment, an AC converter 222 (FIG. 8) can receive a single or multi-phase AC voltage 224 from a power grid. The AC converter 222, in turn, can provide a DC voltage 226 using, for example, a rectifier front end, at input terminals of a DC supply 228, which could be a DC-to-DC buck converter. The DC supply 228, in turn, can provide a distributed DC bus 230 at the input terminals of the segments 12, including: a DC reference voltage rail 232, configured to provide a DC reference voltage ("DC−") such as ground (0 V); a mid-bus DC voltage rail 234, configured to provide half DC power at a mid-bus voltage ("DC 1") such as 200 V; and a full-bus DC voltage rail 236, configured to provide DC power at a full-bus voltage ("DC 2"), such as 400 V. Although illustrated external to the track segment 12, it is contemplated that the DC bus 230 would extend within the segments 12. Each segment 12 includes connectors to which either the DC supply or another track segment may be connected such that the DC bus 230 may extend for the length of the track 10. Optionally, each track segment 12 may be configured to include a rectifier section (not shown) and receive an AC voltage input. The rectifier section in each track segment 12 may convert the AC voltage to the DC bus 230 utilized by the corresponding track segment. It is contemplated that the polarities and magnitudes of the various rails of the DC bus 230 may vary within the scope of the invention.

The processor 204 also receives a feedback signal 209 from the position sensors 150 along the track segment 12 to provide an indication of the presence of one or more movers 100. In each power segment 210, the processor 204 can generate the switching signals 207 to control the various switching devices 220 to provide power to respective coils 50 for propelling a mover 100 while continuously receiving feedback signals for determining positions of the mover 100. For example, in a first leg "A," the processor 204 can drive the upper and lower switching devices 220a and 220b, respectively, to control a corresponding coil 50 in the first leg A to propel the mover 100. The processor 204 can detect movement of the mover 100 from the first leg A toward an area corresponding to the second leg "B" via the feedback signals from the position sensors 150. The processor 204 can then drive the upper and lower switching devices 220a and 220b, respectively, to control a corresponding coil 50 in the second leg B to continue propelling the mover 100, according to a predetermined motion profile. In each leg, the lower switching devices 220b can be coupled to the DC− voltage rail 232, the upper switching device 220a can be coupled to the full-bus DC voltage rail 236, and the coil 50 can be coupled between the upper and lower switching devices 220a and 220b, respectively, on a first side and the mid-bus DC− voltage rail 234 on a second side. Accordingly, the switching devices 220 in each leg can be configured to connect a coil 50 in the leg between rails of the DC bus 230 in various states, such as the upper switching devices 220a connecting or disconnecting full-bus DC voltage rail 236 to a coil 50 causing positive current flow in coil 50, and/or the lower switching device 220b connecting or disconnecting DC− voltage rail 232 to a coil 50 causing negative current flow in coil 50.

The processor 204 receives feedback signals from voltage and/or current sensors mounted at an input or output of the power segment 210 providing an indication of the current operating conditions of the DC bus 230 within the power segment 210 or the current operating conditions of a coil 50 connected to the power segment 210, respectively. According to the illustrated embodiment, sensing resistors 260 are shown between lower switching devices 220b and the DC− reference voltage rail 232 to detect current through the lower switching devices. Signals from either side of the sensing resistors are provided to the signal conditioning circuitry 244. Similarly, a bus sensing resistor 240 is shown in series with the mid-bus DC-voltage rail 234. Signals from either side of the bus sensing resistor 240 are provided to the signal condition circuitry 244 through an isolation circuit 246. The signals are provided via an amplifier 248 and an Analog-to-Digital Converter (ADC) 250 to the processor 204 to provide a measurement of the current flowing through each of the sensing resistors 260 and the bus sensing resistor 240. It is contemplated that still other sensing resistors or other current transducers and voltage transducers may be located at various locations within the power segment 210 to provide current and/or voltage feedback signals to the processor 204 corresponding to current and/or voltage levels present on any leg of the DC bus 230 or at the output to any of the coils 50 connected to the power segment 210.

Figure 10:
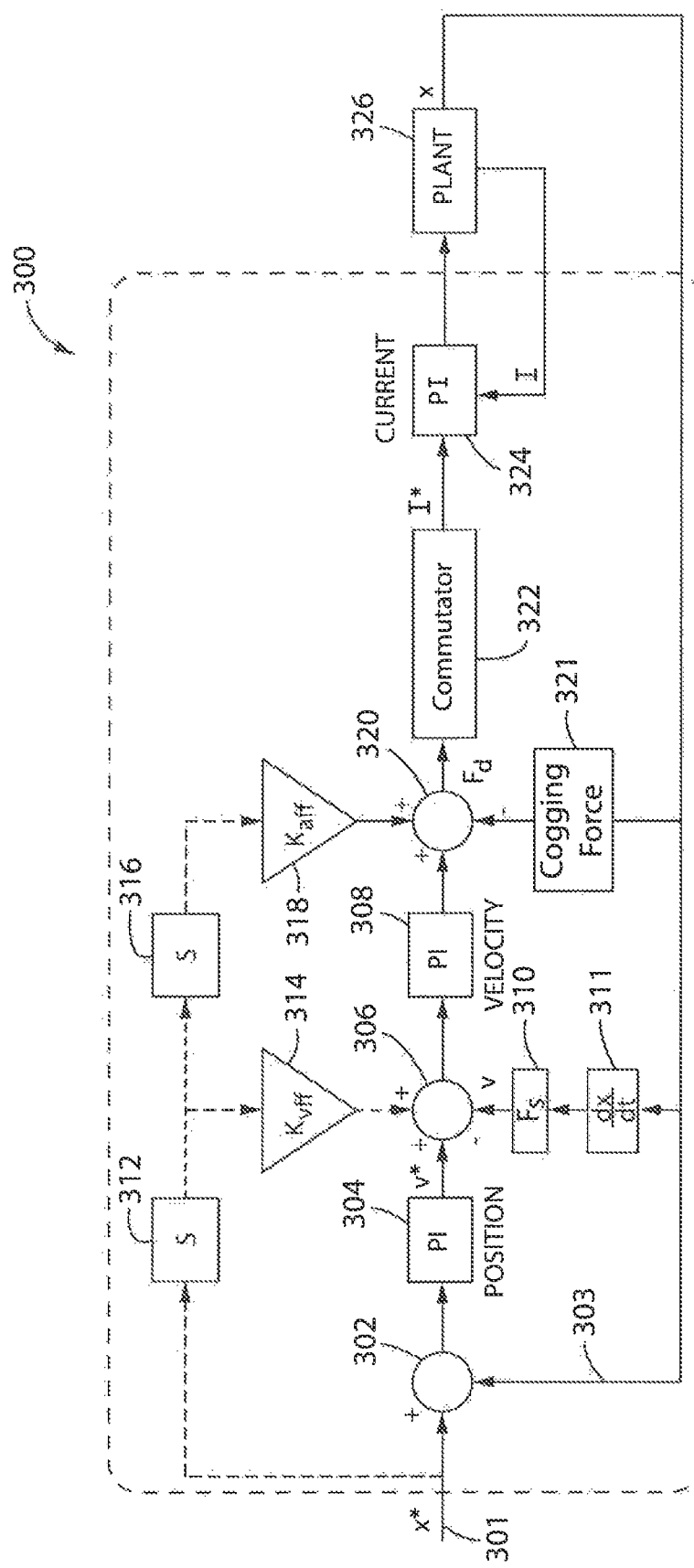
FIG. 10 is a block diagram representation of an exemplary control module executing in one of the segment controllers of FIG. 8.

In operation, the processor 204 for each segment controller 200 is configured to execute a control module 300 which utilizes position and current feedback information to regulate the current output to each coil 50 to achieve desired operation of each mover 100. Referring next to FIG. 10, a control module 300 according to one embodiment of the invention is illustrated. The control module 300 receives a position reference signal (x*) 301 as an input. The position reference signal (x*) 301 is compared to a position feedback signal (x) 303 at a first summing junction 302. A position error signal is output from the first summing junction 302 and input to a position loop controller 304. According to the illustrated embodiment, the position loop controller 304 is a proportional-integral (PI) controller. Optionally, the position loop controller 304 may be just a proportional (P) controller or further include a derivative (D) component. Each of the proportional (P), integral (I), and/or derivative (D) components of the position loop controller 304 includes a controller gain. The controller gains are commonly referred to as a proportional gain (Kpp), integral gain (Kpi), and a derivative gain (Kpd). The output of the position loop controller 304 is a velocity reference signal (v*). The velocity reference signal (v*) is compared to a velocity feedback signal (v) at a second summing junction 306. The velocity feedback signal (v) is generated by taking a derivative, as shown in the derivative block 311, of the position feedback signal (x). The velocity feedback signal (v) may also be filtered by a velocity filter block 310. A velocity error signal is output from the second summing junction 306 and input to a velocity loop controller 308. According to the illustrated embodiment, the velocity loop controller 308 is a proportional-integral (PI) controller. Optionally, the velocity loop controller 308 may be just a proportional (P) controller or further include a derivative (D) component. Each of the proportional (P), integral (I), and/or derivative (D) components of the velocity loop controller 308 includes a controller gain. The controller gains are commonly referred to as a proportional gain (Kvp), integral gain (Kvi), and a derivative gain (Kvd). The output of the velocity loop controller 308 is an acceleration reference signal.

The control module 300 may also include feed forward branches. According to the illustrated embodiment, the control module 300 includes feed forward branches for both the velocity and the acceleration elements. The position reference signal (x*) is passed through a first derivative element 312 to obtain a velocity feed forward signal. The velocity feed forward signal is multiplied by a velocity feed forward gain (Kvff) 314 and combined with the velocity reference signal (v*) and the velocity feedback signal (v) at the second summing junction 306. The velocity feed forward signal is passed through a second derivative element 316 to obtain an acceleration feed forward signal. The acceleration feed forward signal is multiplied by an acceleration feed forward gain (Kaff) 318 and combined with the acceleration reference signal at a third summing junction 320.

As indicated above, the derivative of velocity feedforward is an acceleration feedforward signal and the output of the velocity loop controller 308, absent other gains, is an acceleration reference signal. Each of these signals is combined at the third summing junction 320. It is understood that the acceleration is proportional to a force required to achieve the acceleration according to Newton's second law of motion, which states that a force is equal to a mass multiplied by acceleration. Thus, in order to convert the acceleration terms at the summing junction 320 to force terms, each acceleration term would be multiplied by the mass to be accelerated.

In some embodiments of the control module 300, calculations may be performed in a per unit system. Depending on the per unit system, a range of zero to one hundred percent acceleration may be equivalent to a range of zero to one hundred percent torque. As a result, a per unit value of acceleration would be equivalent to a per unit value of torque and no further gain needs to be applied at the summing junction 320 to convert the acceleration to force. In other embodiments, the mass of the mover 100 or of the mover and load may be incorporated into the controller gains of the velocity loop controller 308 and in the acceleration feedforward path to output a force reference from the third summing junction 320. In still other embodiments, the mass of the mover 100 or of the mover and load may be included as an additional gain before or after the summing junction 320. According to the illustrated embodiment, it is contemplated that the mass is incorporated into the controller gains for the velocity loop controller 308 and in the acceleration feed forward gain (Kaff) 318. Incorporating the mass of the mover into the controller gains reduces the computational requirements during run-time by eliminating an additional gain calculation. The output of the third summing junction 320, therefore, is a force reference, or a desired force, $F_d$, to be applied to a mover 100.

The control module 300 may also be used to reduce or minimize cogging forces present in the linear drive system. The memory device 206 in the segment controller may include a table 321 storing a magnitude of a cogging force that results from a mover 100 traveling along the track segment 12. The table 321 includes a plurality of values corresponding to the position of the mover with respect to the track segment. As shown in FIG. 10, the position feedback signal, x, may be used by the control module 300 to access the cogging table 321 and to identify a magnitude of cogging force at the position. The magnitude of cogging force may be supplied to the third summing junction such that the desired force, $F_d$, compensates for the cogging force. The table 321 may include a separate list of cogging forces for each mover 100. Optionally, movers 100 of similar construction may use a single list of cogging forces and the table may include a separate list of cogging forces for movers of differing construction. The control module 300 may select the stored value for a position that most closely corresponds to the mover's position. Optionally, the control module 300 may two stored values for the cogging force, where the two stored values are located on either side of the present position of the mover, and the control module 300 may interpolate between the two stored values to obtain a more accurate value of the cogging force at the present location.

The commutator 322 in the control module 300 receives the desired force, $F_d$, as an input and determines a current reference for each of the coils 50 that need to be energized to control operation of a mover 100. A track segment 12 may include, for example, twelve coils 50 spaced along the side of the segment. When a single mover 100 is present on the track segment 12, only those coils 50 located under the mover and proximate the drive magnets 140 need to be energized to control operation of the mover 100. With reference, for example, to FIGS. 5-7, it is contemplated that two or three coils 50 may be energized to control operation of the mover 100 illustrated in FIG. 5 depending on the location of the mover along the track, four coils may be energized to control operation of the mover illustrated in FIG. 6, and five or six coils may be energized to control operation of the mover illustrated in FIG. 7 depending on the location of the mover along the track. However, the number of coils required to control operation of a mover is dependent on the construction of the coils, the mover and the drive magnets 140 located on the mover. If multiple movers 100 are present on the track segment 12, the coils 50 located under each of the movers and proximate the respective sets of drive magnets 140 need to be energized to control operation of the respective mover 100. The processor 204 receives position feedback information for each mover 100 and, therefore, identifies the coils 50 located behind each mover(s) that require energization to control operation of the mover 100.

The processor 204 receives a reference signal corresponding to a desired operation of each mover 100 located on the track segment 12. As discussed above, the reference signal may be a motion profile or portion thereof, defining operation of the mover 100 along the track segment 12. The processor 204 may convert the motion profile to the position reference signal (x *) 301 and provide the position reference signal to the control module 300. Based on the current position of each mover 100, the coils present under each mover, the desired force, $F_d$, to be applied to each mover 100 and the desired operating mode, the commutator 322 generates a current reference signal, I*, for each coil 50 proximate a mover.

According to one aspect of the invention, the commutator 322 is operative to determine a desired current reference signal, I*, for each drive coil 50 in one of multiple commutation modes. The commutator 322 may operate in a first operating mode to generate current reference signals for each of the drive coils 50 which minimize the copper losses in the drive coils. In a second operating mode, the commutator 322 generates current reference signals for each of the drive coils 50 to maximize the force applied to the mover 100. In a third operating mode, the commutator 322 generates current reference signals for each of the drive coils 50 that result in balanced currents between the drive coils, where balanced currents indicates that a sum of the currents in each of the drive coils 50 activated for one mover 100 is zero or near zero. In a fourth operating mode, the commutator 322 generates current reference signals for each of the drive coils 50 according to a selected operating point that combines characteristics of the first three operating modes.

The current reference signal, I*, for each drive coil 50 is determined for each of the different operating modes using a single closed form equation as shown below in Equation 1. The commutator 322 iteratively utilizes Equation 1 to determine a current reference signal for each of the "n" coils under a mover 100.

$$i^*(x)_k = \frac{F_d(x)\left(ne(x)_k - \beta \sum_{j=1}^{n} e(x)_j\right) + \alpha(x)\left(\sum_{j=1}^{n} e(x)_j^2 - e(x)_k \sum_{j=1}^{n} e(x)_j\right)}{n \sum_{j=1}^{n} e(x)_j^2 - \beta \left(\sum_{j}^{n} e(x)_j\right)^2} \quad (1)$$

where: x is the present position of the mover;
n is the number of coils energized to control the mover;
k is an individual coil number between 1 and n;
$i^*(x)_k$ is the current for the $k_{th}$ coil at the present position of the mover;
$F_d(x)$ is the desired force output from the control module;
$e(x)_k$ is the back-emf for the $k_{th}$ coil at the present position of the mover; and $$\alpha(x) = a\sin\left(\frac{2\pi x}{\tau}\right) \quad (2)$$

where: τ is the coil pitch; and
a is the desired sum of active coil currents.

The desired operating mode is selected, at least in part, by the selection of values for α and β in equations 1 and 2 above. When α and β are both set equal to zero, the commutator 322 will operate in the first operating mode. When a is set equal to zero and β is set equal to one, the commutator 322 will operate in the third operating mode. When β is set equal to one and α is equal to a non-zero value, the commutator 322 will operate in the desired operating mode as a function of the desired sum of active coil currents indicated in "a" of equation 2.

Figure 11:
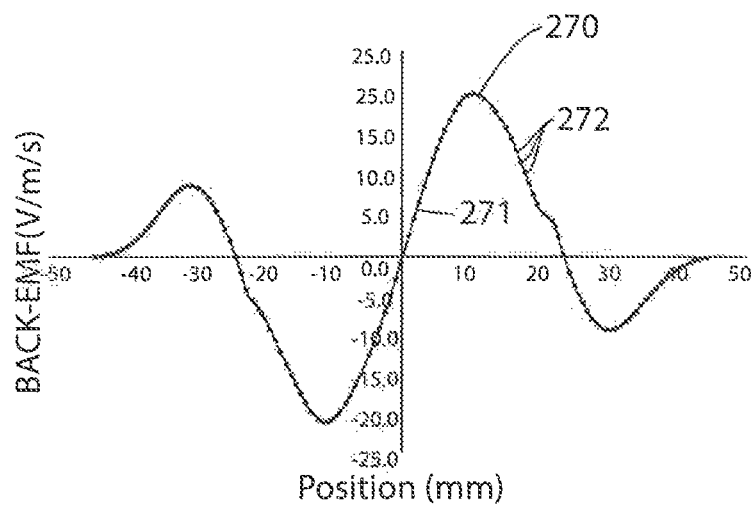
FIG. 11 is a graphical representation of an exemplary back-emf waveform stored in the motor controller for the mover of FIG. 5.
Figure 12:
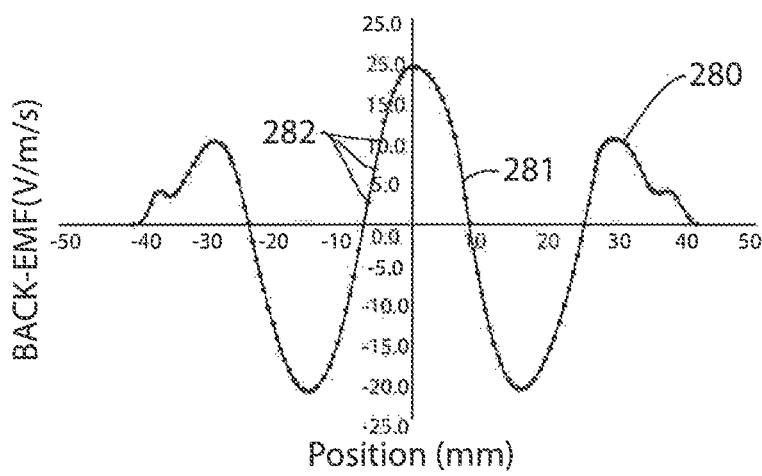
FIG. 12 is a graphical representation of an exemplary back-emf waveform stored in the motor controller for the mover of FIG. 6.
Figure 13:
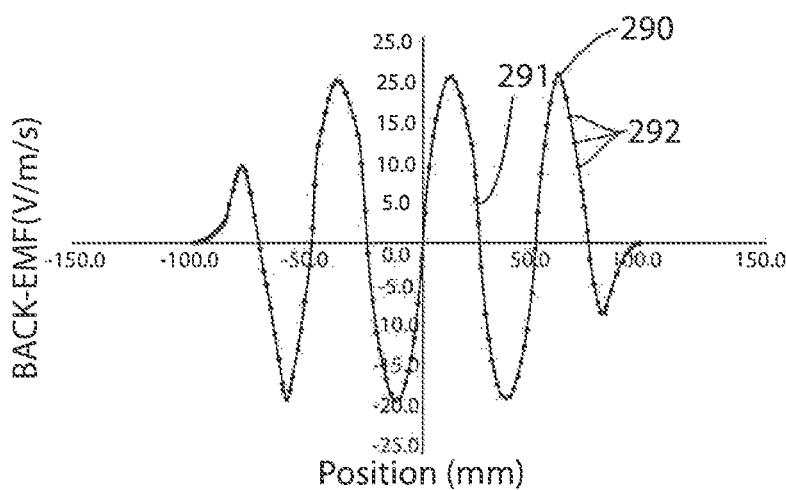
FIG. 13 is a graphical representation of an exemplary back-emf waveform stored in the motor controller for the mover of FIG. 7.

As indicated in Equation 1, the back-emf induced in each coil by the drive magnets 140 on the mover is used to determine the current reference signals. It is contemplated that the back-emf for each coil 50 may be stored in a table in the memory device 206 on the segment controller 200. With reference to FIGS. 11-13, three exemplary back-emf waveforms are illustrated. Each waveform corresponds to the back-emf induced in a single coil 50 by a mover 100 passing by the coil. Further, the three waveforms correspond to the same coil 50 generating a different back-emf waveform as a result of a mover 100 having a different construction passing the coil. The exemplary back-emf waveforms in FIGS. 11-13 correspond to the movers shown in FIGS. 5-7 each passing the same coil 50. According to the illustrated embodiment, a first back-emf waveform 270 shown in FIG. 11 is generated by the mover in FIG. 5 passing a coil, a second back-emf waveform 280 shown in FIG. 12 is generated by the mover in FIG. 6 passing the coil, and a third back-emf waveform 290 shown in FIG. 13 is generated by the mover in FIG. 7 passing a coil.

Each of the plots 270, 280, 290 in FIGS. 11-13 are illustrated with both a continuous waveform and a number of points. The continuous waveform 271, 281, 291 corresponds to the back-emf generated by the mover 100 as it passes the coil. The points 272, 282, 292 correspond to values stored in the memory device 206 for each waveform. A finite number of points may be stored for each waveform and each point corresponds to a particular location along the track 10. When the commutator 322 determines the current reference for a coil, the mover's position along the track is obtained from the position sensors 150 located along the track. The value for the back-emf waveform is then read from the memory device, where the particular stored back-emf waveform is selected based on the coil and the mover. In one embodiment, the commutator 322 may select the stored value for a position that most closely corresponds to the mover's position. Optionally, the commutator 322 may read the stored values for two positions of the back-emf waveform, where the two stored values are located on either side of the present position of the mover, and the commutator 322 may interpolate between the two stored values to obtain a more accurate value of the back-emf waveform for use in Equation 1.

As previously indicated, the commutator 322 may be configured to operate in different modes. In each mode, the commutator 322 determines current references for each coil 50 according to different criterion. With reference to Equation 2 above, the term "a" is used to select in which operating mode the commutator operates.

Selection of a desired operating mode is dependent on a number of factors. For discussion, an exemplary mover receives an object for delivery at a first location and delivers the object to a second location. At a loading station, the mover is stopped and the object is loaded on the mover. The mover then accelerates from zero speed up to a transport speed during which the object is loaded on the mover. As the mover approaches the delivery station, the mover decelerates from the transport speed to zero speed. At the delivery station, the object is removed from the mover. The mover again accelerates from zero speed up to a return speed during which the mover is unloaded. The mover decelerates from the return speed back to zero speed as it approaches the loading station.

In the example, periods of acceleration and deceleration typically require the greatest amounts of current. During these periods, it may be desirable to operate under the first operating mode to minimize copper losses and, therefore, reduce heating in the coils when the current is high. When the mover is traveling between the loading and unloading station, it may require operating mode two such that the maximum force is provided to the mover, allowing the mover to transport the object loaded on the mover. When the mover is returning from the unloading station to the loading station, it may be desirable to operate in the third operating mode, such that there is a zero sum of current present in the coils used to control the mover. Having a zero sum current lowers the demand on the power supply providing current to the coils and, therefore, allows either a greater number of movers to be controlled by one power supply or allows for a power supply having a lower rating, which typically results in a lower cost, to be utilized. The above example is not intended to be limiting and it is understood that various other factors and application requirements may influence the selection of zones without deviating from the scope of the invention. Each zone may span an entire track segment 12 or there may be multiple zones on one track segment. The segment controller is configured to operate in the desired operating mode or modes when a mover 100 is travelling along the segment and is located in the corresponding zone or zones.

Figure 14:
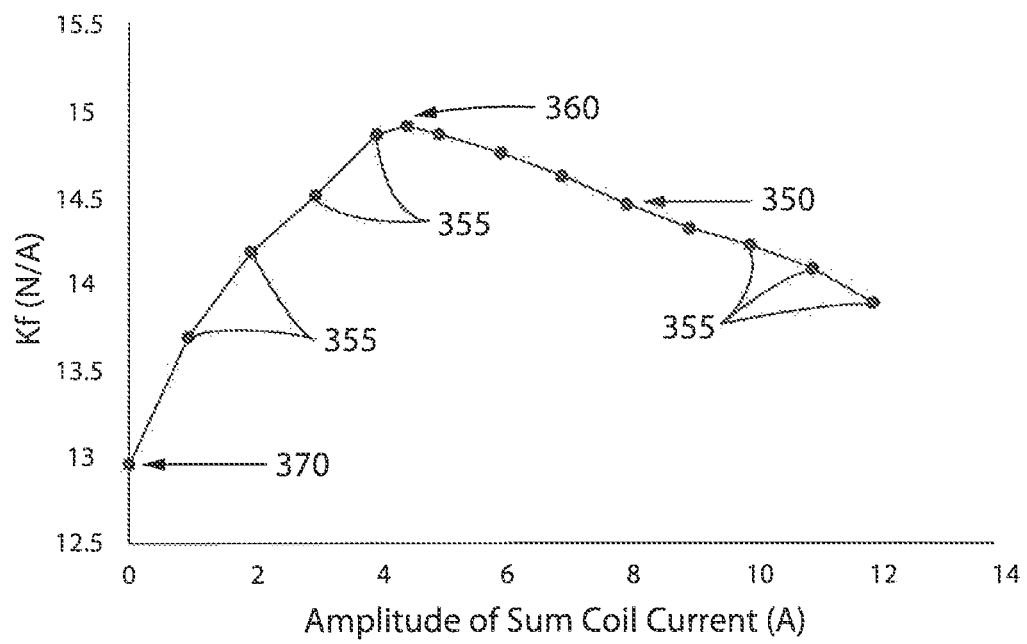
FIG. 14 is a graphical representation of a force constant plotted with respect to an amplitude of the sum of coil currents for an exemplary mover according to one embodiment of the invention.
Figure 15:
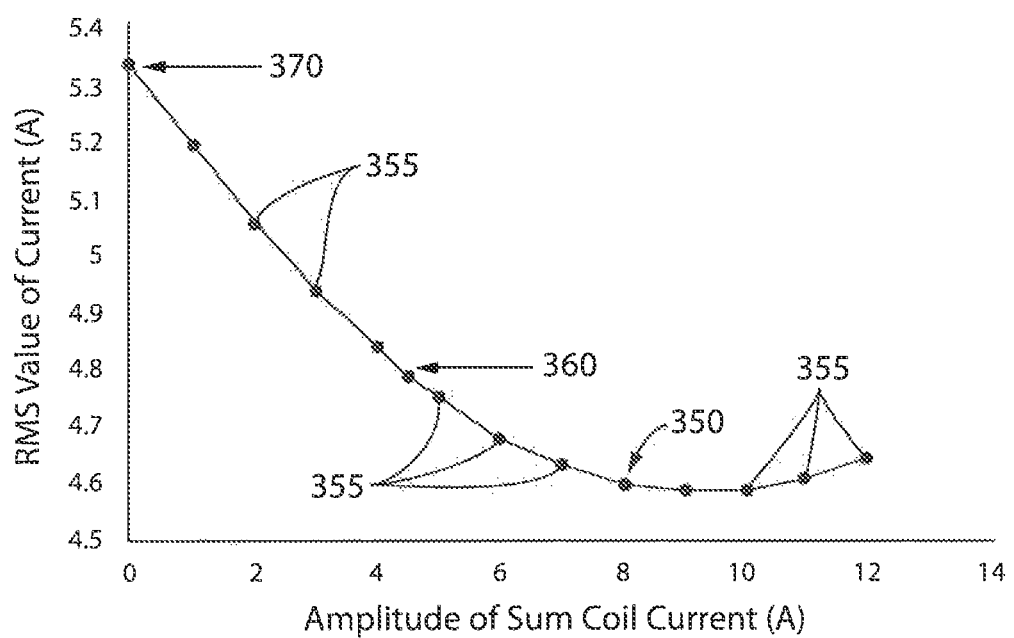
FIG. 15 is a graphical representation of an rms-value of current plotted with respect to the amplitude of the sum of coil currents for the exemplary mover of FIG. 14.

With reference next to FIGS. 14 and 15, operation of a mover 100 may be initially characterized at a number of different operating points. In the illustrated embodiment, a mover 100 is characterized at fourteen operating points 355; however, it is understood that varying numbers of operating points at different current intervals may be selected without deviating from the scope of the invention. Each operating point corresponds to a different sum of the currents present in the coils 50 controlling operation of the mover 100. FIG. 14 illustrates a force constant, Kf, corresponding to the amount of force applied to the mover 100 as a result of the sum of the currents present in the coils 50 controlling operation of the mover 100. As the force constant increases, the force applied to the mover 100 increases. FIG. 15 illustrates the rms value of current present in the coils controlling operation of the mover 100. The rms value of current includes both the components of current that are producing force on the mover and the components of current that are causing copper losses in the coils. Thus, for the same applied force on the mover, as the rms value of the current is reduced, the magnitude of copper losses present in the coils is reduced.

A set of curves, corresponding to the plots in FIGS. 14 and 15, may be stored in the memory 206 on the segment controller for each mover 100. Optionally, one set of curves for multiple movers 100 of similar construction may be stored. The set of curves define each of the operating modes for the commutator 322. In the first operating mode, the commutator 322 generates current reference signals for each of the drive coils 50 which minimize the copper losses in the drive coils. The processor may determine a minimum value in the plot in FIG. 15 (or in the values for the plot stored in memory) corresponding to a minimum value of current present that causes the copper losses. In FIG. 15, the operating point is identified by reference numeral 350. According to the illustrated embodiment, the sum of the coil currents at this point is eight amps. The operating point 350 at eight amps is similarly marked in FIG. 14 for reference. In the second operating mode, the commutator 322 generates current reference signals for each of the drive coils 50 to maximize the force applied to the mover 100. The processor may determine a maximum value in the plot in FIG. 14 (or in the values for the plot stored in memory) corresponding to the maximum force constant determined during the characterization of the mover 100. In FIG. 14, the operating point is identified by reference numeral 360. According to the illustrated embodiment, the sum of the coil currents at this point is four and one-half amps. The operating point 360 at four and one-half amps is similarly marked in FIG. 15 for reference. In the third operating mode, the commutator 322 generates current reference signals for each of the drive coils 50 that result in balanced currents between the drive coils. As previously indicated, when the commutator 322 generates current reference signals for each of the drive coils 50 that result in balanced currents, the sum of the currents in each of the drive coils is zero or near zero. In both FIGS. 14 and 15, the operating point identified by the reference numeral 370 is located at zero amps. For each operating point identified above, the corresponding current at the operating point is the value of "a" for Equation 2 above. Setting "a" to the corresponding current will cause the closed form determination of current reference signals performed in Equation 1 to determine the current reference for the desired operating mode.

In addition to the three operating modes discussed above, the commutator 322 may be configured to operate in a fourth operating mode. A value of current for desired operating point may be stored in the memory 206 of the segment controller which corresponds to the desired operating point. In one aspect of the invention, the value of current for the desired operating point may be determined automatically by the processor 204 as discussed above. Optionally, a user may adjust the value of the current via a user interface connected to the segment controller 200 or via the user interface 36 connected to the system controller 30, where the system controller 30 transmits the new value of the current to the segment controller 200. The new value of current may be for any sum of coil currents shown in FIGS. 14 and 15. Consequently, an operating point between any of the first three operating points may be selected.

In addition to selection based on the location of the mover, the segment controller may include an input signal by which an operating mode may be selected. In one aspect of the invention, the input signal may be, for example, a data word or multiple bits by which any of the different operating modes may be selected. In another aspect of the invention, the input may be a logical input receiving either a logical zero or a logical one as an input. The segment controller may be configured to execute in one operating mode when the input is a logical zero and in another operating mode when the input is a logical one. In this manner, each the segment controller 20 may be operative to select different commutation modes for the same mover 100 based on other factors in the controlled system.

According to another aspect of the invention, the commutator 322 may be further configured to detect when one of the coils 50 will be saturated and distribute the excess current from the saturated coil to the other coils controlling operation of a mover 100. During the calculation of current reference signals, I*, the back-emf for each of the coils is determined, as described above. The commutator 322 may initially sort the values for each of the back-emf values in descending order. By sorting the back-emf values in descending order, the coil with the greatest back-emf is identified. Further, it is the coil with the greatest back-emf that will be the first coil to become saturated. Therefore, sorting the back-emf values according to descending order identifies the coil or coils most likely to saturate.

After sorting the back-emf values, the commutator 322 determines an initial set of current reference signals, I*, using Equation 1 as described above. The current reference signal, I*, for the coil with the greatest back-emf value is first compared to a maximum current value. If the current reference signal is less than the maximum current value, the commutator 322 outputs the current reference signals to the current regulator 324. If, however, the current reference signal for the coil with the greatest back-emf value is greater than the maximum current value, then the commutator 322 sets the current reference signal for the coil with the greatest back-emf value to the maximum current value and redistributes the excess current to the other coils.

In order to redistribute the excess current, the commutator 322 first determines the force that will be generated as a result of the current in the coil that has been limited to the maximum current. The force applied to the mover by the coil is equal to the magnitude of the current multiplied by the back-emf value for the coil. This force is subtracted from the desired force that was previously determined and which was used to determine the initial set of current reference signals. The new desired force is utilized by Equation 1 to determine a new set of current reference signals for the remaining drive coils which were not set to the maximum current value. After obtaining a new set of current reference signals, the commutator 322 can again verify that there are no current reference signals greater than the maximum current value using the steps described above. If there are still any current reference signals greater than the maximum current value, another current reference signal may be set to the maximum current value and the remaining current redistributed to the coils not limited. The process repeats until either all of the coils are set to output the maximum current value or there are no current reference signals greater than the maximum current value.

With reference again to FIG. 10, the current reference signal, I*, is then output from the commutator 322 and provided as an input to the current regulator 324. According to the illustrated embodiment, the current regulator 324 is a proportional-integral (PI) controller. Optionally, the current regulator 324 may be just a proportional (P) controller or further include a derivative (D) component. Each of the proportional (P), integral (I), and/or derivative (D) components of the current regulator 324 includes a controller gain. The controller gains are commonly referred to as a proportional gain (Kip), integral gain (Kii), and a derivative gain (Kid). The output of the current regulator 324 is used to generate the switching signals 207 which, in turn, connect the DC bus 230 and provide the desired current to the coils 50. It is further contemplated that the current reference signal, I*, output from the commutator 322 may be a vector value. In other words, the current reference signal, I*, may include multiple reference values, where each reference value corresponds to the current to be provided to one of the coils 50. The current regulator 324 may be configured to operate on the vector or, optionally, separate current regulators 324 may be provided for each coil 50.

The current is output from the power segment 210 to each of the coils 50. The plant 326 in FIG. 10 corresponds to the linear drive system, including the coils and the movers traveling along the track. Current feedback signals, I, are fed back from each coil to the control module 300 for the current regulators 324 to control the current. The position feedback signals from each sensor 150 are provided to the control module 300 as a mover travels along the corresponding track segment 12.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. A method for controlling commutation of drive coils to control operation of a mover along a track in a linear drive system, the method comprising the steps of:
    obtaining a position of the mover along the track with a motor controller;
    identifying a plurality of drive coils proximate the position of the mover with the motor controller, wherein an electromagnetic field generated by a current flowing in each of the plurality of drive coils is operative to engage at least one drive magnet on the mover;
    receiving a reference signal at the motor controller corresponding to a desired operation of the mover;
    determining a current reference for each of the plurality of drive coils with the motor controller responsive to the reference signal according to a single commutation function, wherein the single commutation function includes at least one coefficient operative to change a commutation mode in the motor controller, wherein the commutation mode determines the current reference for each of the plurality of drive coils as a function of a desired force to be applied to the mover; and
    changing the at least one coefficient from a first value to a second value to select one of a plurality of commutation modes in the motor controller.

2. The method of claim 1 wherein:
    the track has a plurality of track segments,
    the motor controller sets the at least one coefficient to the first value in a first segment to determine the current reference for each of the plurality of drive coils in the first segment according to a first commutation mode, and
    the motor controller sets the at least one coefficient to the second value in a second segment to determine the current reference for each of the plurality of drive coils in the second segment according to a second commutation mode.

3. The method of claim 1 wherein:
    the motor controller is operative to receive an external input signal,
    the motor controller sets the at least one coefficient to the first value when the external input signal is in a first state to determine the current reference for each of the plurality of drive coils according to a first commutation mode, and
    the motor controller sets the at least one coefficient to the second value when the external input signal is in a second state to determine the current reference for each of the plurality of drive coils according to a second commutation mode.

4. The method of claim 1 further comprising the step of determining the desired force to be applied to the mover as a function of the reference signal, of the position of the mover, and of a control mode selected for the motor controller.

5. The method of claim 1 further comprising the steps of:
    comparing the current reference determined for each of the plurality of drive coils to a predefined maximum current value;
    identifying a first drive coil, from the plurality of drive coils, for which the current reference exceeds the predefined maximum current value;
    setting the current reference for the first drive coil to the predefined maximum current value; and determining a new current reference for each of the other drive coils with the motor controller according to the selected commutation mode.

6. The method of claim 1 wherein the plurality of commutation modes includes a first commutation mode operative to minimize copper losses in each of the plurality of drive coils, a second commutation mode operative to maximize a force applied to the mover by each of the plurality of drive coils, and a third commutation mode operative to provide a balanced current in each of the plurality of drive coils.

7. The method of claim 6 wherein the plurality of commutation modes further includes a fourth commutation mode operative to select a desired sum of the currents in the plurality of drive coils.

8. A motor controller for controlling commutation of drive coils to control operation of a mover along a track in a linear drive system, the motor controller comprising:
    at least one first input operative to receive a position feedback signal corresponding to a position of the mover along the track;
    at least one second input operative to receive a reference signal corresponding to a desired operation of the mover along the track;
    a power segment operative to provide a current to each of a plurality of drive coils operatively connected to the power segment; and
    a processor operative to:
    identify a portion of the plurality of drive coils proximate the position of the mover along the track, wherein an electromagnetic field generated by the current flowing in each coil is operative to engage at least one drive magnet on the mover,
    determine a desired force applied to the mover as a function of the reference signal, of the position of the mover, and of a control mode selected for the motor controller,
    generate a current reference signal for each coil in the portion of the plurality of drive coils proximate the position of the mover along the track according to one of a plurality of commutation modes, wherein the commutation mode determines the current reference for each of the plurality of drive coils as a function of the desired force applied to the mover, and
    transmit the current reference signal for each drive coil in the portion of the plurality of drive coils proximate the position of the mover to the power segment, wherein the power segment provides the current to each coil according to the corresponding current reference signal.

9. The motor controller of claim 8 wherein the track has a plurality of track segments and the processor is further operative to:
    generate the current reference signal for each of the plurality of drive coils in a first segment according to a first commutation mode, and
    generate the current reference signal for each of the plurality of drive coils in a second segment according to a second commutation mode.

10. The motor controller of claim 8 further comprising a third input operative to receive a commutation selection signal, wherein the processor is further operative to:
    generate the current reference signal for each of the plurality of drive coils according to a first commutation mode when the commutation selection signal is in a first state, and
    generate the current reference signal for each of the plurality of drive coils according to a second commutation mode when the commutation selection signal is in a second state.

11. The motor controller of claim 8 wherein the processor is further operative to generate the current reference for each coil according to a single commutation function, wherein the single commutation function includes at least one coefficient operative to select one of the plurality of commutation modes in the motor controller.

12. The motor controller of claim 11 further comprising a memory device operative to store the at least one coefficient, wherein the processor is further operative to read the at least one coefficient from the memory device and to generate the current reference signal according to the desired commutation mode.

13. The motor controller of claim 8 wherein the plurality of commutation modes includes a first commutation mode operative to minimize copper losses in each of the plurality of drive coils, a second commutation mode operative to maximize a force applied to the mover by each of the plurality of drive coils, and a third commutation mode operative to provide a balanced current in each of the plurality of drive coils.

14. The motor controller of claim 13 wherein the plurality of commutation modes further includes a fourth commutation mode operative to select a desired sum of the currents in the plurality of drive coils.

15. The motor controller of claim 8 wherein the processor is further operative to generate the current reference for each of the plurality of drive coils in each of the plurality of commutation modes as a function of: the commutation mode, the position of the mover, the desired force to be applied to the mover, and a back-emf value for each of the plurality of drive coils.

16. The motor controller of claim 8 wherein the processor is further operative to:
    compare the current reference signal determined for each of the plurality of drive coils to a predefined maximum current value,
    identify a first drive coil, from the plurality of drive coils, for which the current reference signal exceeds the predefined maximum current value,
    set the current reference signal for the first drive coil to the predefined maximum current value, and
    determine a new current reference signal for each of the other drive coils according to the selected commutation mode.

17. A method for controlling commutation of drive coils to control operation of a mover along a track in a linear drive system, the method comprising the steps of:
    obtaining a position of the mover along the track with a motor controller;
    identifying a plurality of drive coils proximate the position of the mover with the motor controller, wherein an electromagnetic field generated by a current flowing in each of the plurality of drive coils is operative to engage at least one drive magnet on the mover;
    receiving a reference signal at the motor controller corresponding to a desired operation of the mover;
    determining a desired force to be applied to the mover as a function of the reference signal, of the position of the mover, and of a control mode selected for the motor controller;
    selecting one of a plurality of commutation modes in the motor controller to determine a current reference for each of the plurality of drive coils; and determining the current reference for each of the plurality of drive coils with the motor controller as a function of: the selected commutation mode, the position of the mover, the desired force to be applied to the mover, and a back-emf value for each of the plurality of drive coils.

18. The method of claim 17 wherein the step of determining the current reference for each of the plurality of drive coils uses a single commutation function that includes at least one coefficient operative to select one of the plurality of commutation modes in the motor controller.

19. The method of claim 17 wherein the commutation mode is selected as a function of a desired sum of coil currents for each of the plurality of drive coils.

20. The method of claim 17 further comprising the steps of:
   comparing the current reference determined for each of the plurality of drive coils to a predefined maximum current value;
   identifying a first drive coil, from the plurality of drive coils, for which the current reference exceeds the predefined maximum current value;
   setting the current reference for the first drive coil to the predefined maximum current value; and
   determining a new current reference for each of the other drive coils with the motor controller according to the selected commutation mode.

* * * * *